United States Patent [19]

Kremer

[11] Patent Number: 5,390,164
[45] Date of Patent: Feb. 14, 1995

[54] RING INTERWORKING BETWEEN BIDIRECTIONAL LINE-SWITCHED RING TRANSMISSION SYSTEMS

[75] Inventor: Wilhelm Kremer, Andover, Mass.

[73] Assignee: AT&T Corp., Murray Hill, N.J.

[21] Appl. No.: 141,151

[22] Filed: Oct. 22, 1993

[51] Int. Cl.$^6$ .......................... H04L 1/20; H04L 1/22
[52] U.S. Cl. .................................. 370/16.1; 371/8.2; 371/11.2; 371/20.6
[58] Field of Search ................. 370/16, 16.1, 55, 58.3, 370/85.9, 85.11, 40, 85.15; 359/110; 340/827; 371/8.1, 8.2, 11.1, 11.2, 20.1, 20.2, 20.6

[56] References Cited

U.S. PATENT DOCUMENTS

| | | | |
|---|---|---|---|
| 5,179,548 | 1/1993 | Sandesara | 370/16.1 |
| 5,187,706 | 2/1993 | Frankel et al. | 370/16.1 |
| 5,218,604 | 6/1993 | Sosnosky | 370/85.14 |

OTHER PUBLICATIONS

U.S. application Ser. No. 855,795, filed Mar. 26, 1992, Kremer.
"SONET Add-Drop Multiplex Equipment (SONET ADM) Generic Criteria for a Unidirectional, Path Protection Switched, Self-Healing Ring Implementation", Bellcore Technical Advisory TA-TSY-000496, Issue 3, Aug. 1990.
"Ring Interworking Issues, Solutions and Product Implications and FT-2000" Engineer's Notes by W. Kremer, AT&T, Mar. 23, 1993, pp. 1-3 and 1-8.
"SWB Ring Interconnection Architecture Issues and Proposed Interim Solutions", Contribution to T1 Standards Project, T1X1.2, by Joseph Sosnosky and Jonathan A. Morgan, Bellcore, Mar. 1, 1991, pp. 1-6.
"SONET Ring Interworking Issues" Committee T1 Contribution, T1X1.2/93-003, by Barbara E. Smith Southwestern Bell Technology Resources, Inc., and Cliff Yackle, Southwestern Bell Telephone Company, Mar. 1, 1993, pp. 1-18.
"Ring Interworking With A Bidirectional Ring" Contribution to T1 Standards Project, T1X1 . . . 5/91-043, by W. Kremer, AT&T, Apr. 15, 1991, pp. 1-26.

*Primary Examiner*—Melvin Marcelo
*Attorney, Agent, or Firm*—Thomas Stafford

[57] ABSTRACT

The possibility of passing off apparent "good" higher level digital signals that may include corrupted or failed lower level digital signals because of inter-ring grooming of the lower level digital signals from one bidirectional line-switched ring to another bidirectional line-switched ring, employing at least a first shared node and a second shared node, is minimized by dual feeding communications circuits from one line-switched ring to the other via the shared nodes. An inter-ring groomed communications circuit is provisioned from a secondary ring node of one of the shared nodes (secondary communications circuit) of a particular ring to be supplied to a primary ring node in the other shared node of the same ring. Additionally, a replica of the secondary communications circuit is demultiplexed in the primary ring node to obtain the lower level digitals signals therefrom. Then, the lower level digital signals in the secondary communications circuit are evaluated on a pairwise basis with corresponding lower level digital signals in a corresponding communications circuit (primary communications circuits) being supplied from the inter-ring grooming apparatus associated with the primary ring node to determine the least corrupted signal in each pair. The least corrupted lower level signals are selected and combined into a "new" primary communications circuit which is inserted in the primary ring node.

7 Claims, 9 Drawing Sheets

FIG. 5

RING NODE ID TABLE

| NODE ID |
|---------|
| 110 ID |
| 111 ID |
| 112 ID |
| 113 ID |
| 114 ID |
| 115 ID |

FIG. 6

COMMUNICATIONS CIRCUIT ID TABLE FOR RING NODE 111

| STS # | A TERMINATION | Z TERMINATION(S) | INERWORKING COMMUNICATION CIRCUIT |
|-------|---------------|------------------|------------------------------------|
| a | 110 | 111 | NO |
| b | 111 | 113 | NO |
| c | 110 | 112,114 | YES |
| d | 111 | 115 | NO |
| ⋮ | ⋮ | ⋮ | ⋮ |

RING INTERWORKING BETWEEN BIDIRECTIONAL LINE-SWITCHED RING TRANSMISSION SYSTEMS

CROSS-REFERENCE TO RELATED APPLICATIONS

U.S. patent applications Ser. No. 08/141,141 and Ser. No. 08/141,172 were filed concurrently herewith.

TECHNICAL FIELD

This invention relates to ring transmission systems and, more particularly, to interworking between bidirectional line-switched ring transmission systems.

BACKGROUND OF THE INVENTION

It has become increasingly important to maintain communications connectivity in the presence of transmission system failures. To this end, ring interworking arrangements have been proposed for transporting communications circuits between bidirectional line-switched rings. Ring interworking is essentially a dual feed of communications circuits from a first ring to a second ring. The dual feeding takes place across two different sites, each with ring nodes for both the first and second rings, in order to provide the physical diversity necessary to enable the cross-ring communications circuits to survive a failure of one of the two shared sites. The second ring performs a receive switch based on some parameter or set of parameters of the two signals being fed from the first ring. For the other direction of the same end-to-end cross-ring communications circuits, the second ring dual feeds communications circuits to the first ring. The first ring performs a receive switch of the two signals being fed from the second ring.

A problem arises when there is a need to groom the inter-ring communications traffic by way of intervening wide-band digital cross-connect systems (DCS), multiplexers (MUX) or the like, where the grooming is being done at a different digital signal level, i.e., bit rate, than is being used in the rings. Examples are DS1 digital signals in DS3 signals and VT SONET signals in STS-1 SONET signals. In such arrangements, if a failure occurs incoming to the DCS, MUX or other grooming apparatus from one ring, it will not be recognized by the other ring because the inter-ring grooming apparatus will only insert the DS1 or VT failure indication and not the DS3 or STS-1 failure indication. Consequently, the inter-ring groomed signals, i.e., DS3s or STS-1s, passed off to either ring could appear to be "good" but could, in fact, contain corrupted or failed lower level digital signals, i.e., DS1s or VTs.

One attempt at avoiding the problems associated with inter-ring grooming of lower level digital signals in the higher level digital signals employed in interworking path-switched rings is described in a contribution to T1 Standards Project T1X1.2 entitled "SWB Ring Interconnection Architecture Issues and Proposed Interim Solutions", T1X1.2/93-013, dated Mar. 1, 1993. If the path-switched ring solution proposed in the noted Contribution T1X1.2/93-013 were to be applied to interworking bidirectional line-switched rings, the result would be an inefficient arrangement requiring the use of additional service bandwidth between the shared interworking nodes, the use of additional equipment in the nodes and the use of more interface and grooming capacity in the inter-ring grooming apparatus.

SUMMARY OF THE INVENTION

The problems related to the possibility of passing off apparent "good" higher level, i.e., bit rate, digital signals that may include corrupted or failed lower level, i.e., bit rate, digital signals because of inter-ring grooming of the lower level digital signals from one bidirectional line-switched ring to another bidirectional line-switched ring employing at least a first shared node and a second shared node are overcome, in accordance with the invention, by dual feeding communications circuits from one line-switched ring to the other via the shared nodes, by provisioning at least one inter-ring groomed communications circuit from a secondary ring node of one of the shared nodes (secondary communications circuit) of a particular ring to be supplied to a primary ring node in the other shared node of the same ring and provisioning the primary ring node so that the at least one supplied secondary communications circuit is a candidate to be selected as a through communications circuit. Additionally, a replica of the at least one secondary communications circuit is obtained in the primary ring node and demultiplexed to obtain the lower level digitals signals therefrom. Then, the lower level digital signals in the at least one secondary communications circuit are evaluated on a one-to-one pairwise basis with corresponding lower level digital signals in a corresponding communications circuit (primary communications circuits) being supplied from the inter-ring grooming apparatus associated with the primary ring node. The selected lower level digital signals are combined into a "new" primary communications circuit which is added in the primary ring node via a selector into the transmission path.

The selector in the primary ring node is revertively biased to normally select the "new" primary communications circuits in order to protect against selecting secondary communication circuits as through communications circuits in the primary ring node when there is an interconnect or other failure to the inter-ring grooming apparatus in the shared node supplying the secondary communications circuits. The provisioning of the primary ring node and the secondary ring node is such that the demultiplexing to obtain the lower level digital signals, their evaluation and selection, and multiplexing only need be done in the primary ring node and not in both.

Specifically, the inter-ring groomed at least one secondary communications circuit is demultiplexed to obtain the lower level digital signals. The primary and corresponding secondary lower level digital signals are evaluated on a one-to-one pairwise basis to determine the "best" signal of each pair. Then, the determined best lower level digital signals are selected by selectors to be multiplexed into a "new" primary inter-ring groomed communications circuit. The "new" primary communications circuit is then normally selected in the primary ring node to be added to the transmission path. However, in the case of an interconnect or other failure in the primary ring node the revertive selector selects the at least one communications circuit to the termination ring node for the primary ring node. Upon the failure being corrected, the revertive selector automatically reverts back to selecting the "new" primary communications circuit to the termination ring node.

BRIEF DESCRIPTION OF THE DRAWING

In the drawing:

FIG. 5 is an exemplary ring node ID table included in memory of the controller of FIG. 2;

FIG. 6 is an exemplary communications circuit ID table also included in memory of the controller of FIG. 2 for ring node 111;

DETAILED DESCRIPTION

Figure 1:
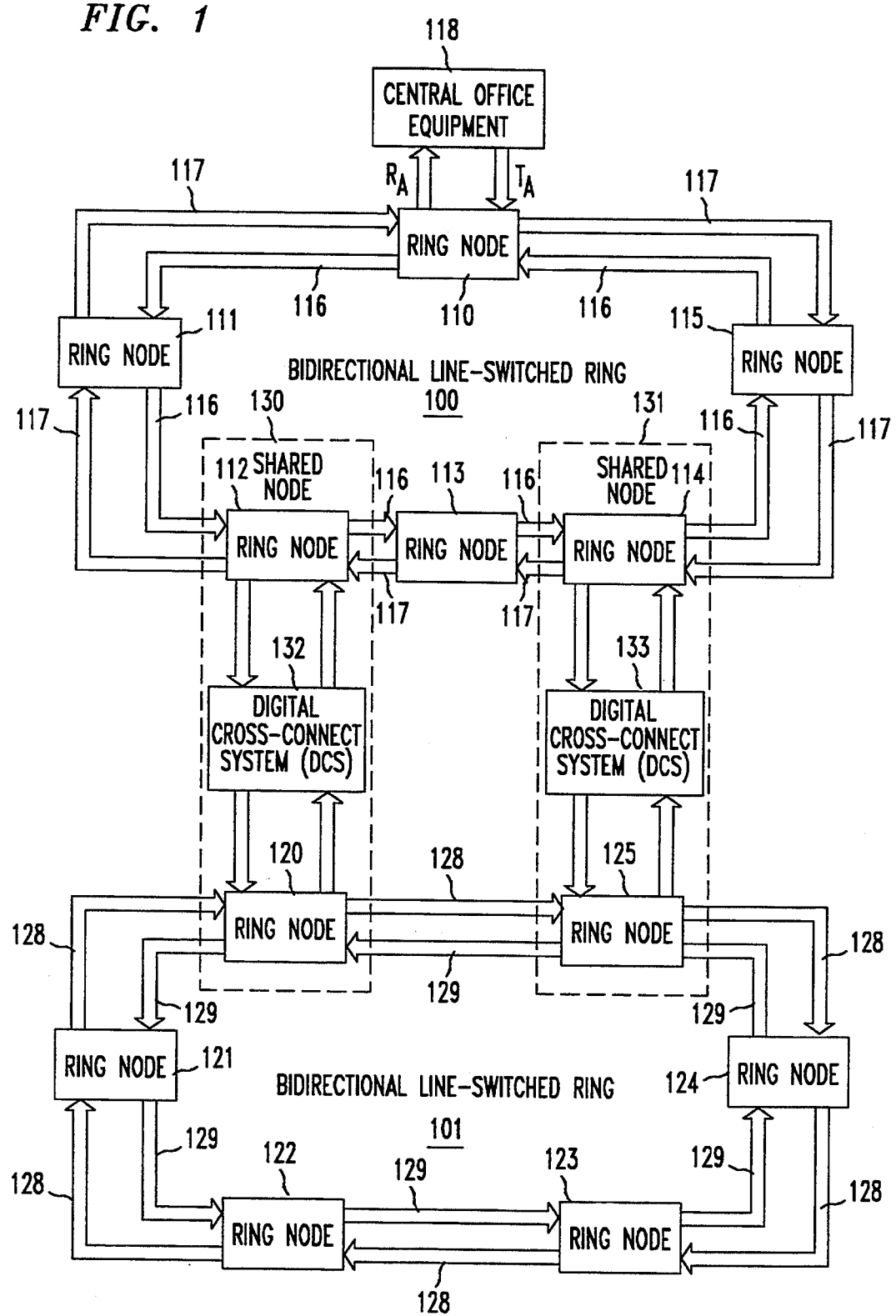
FIG. 1 shows, in simplified block diagram form, a bidirectional line-switched ring transmission system interworking with another bidirectional line-switched ring transmission system including inter-ring grooming.

FIG. 1 shows, in simplified form, bidirectional line-switched ring transmission system 100 interworking with another bidirectional line-switched ring transmission system 101. In this example, bidirectional line-switched ring 100 includes ring nodes 110 through 115, and the other bidirectional line-switched ring 101 includes ring nodes 120 through 125. Ring nodes 112 and 120 form first shared node 130 for interworking communications circuits between bidirectional line-switched ring 100 and bidirectional line-switched ring 101. Similarly, ring nodes 114 and 125 form an additional shared node 131 for interworking communications circuits between bidirectional line-switched ring 100 and bidirectional line-switched ring 101. In this example, ring nodes 112 and 120 in shared node 130 are shown as being interconnected by inter-ring grooming apparatus, namely, digital cross-connect system (DCS) 132. Similarly, ring nodes 114 and 125 in shared node 131 are shown as being interconnected by inter-ring grooming apparatus, namely, digital cross-connect system (DCS) 133. Both DCS 132 and DCS 133 are so-called wide-band cross-connect systems of a type known in the art and described in the Technical Reference entitled "Wideband and Broadband Digital Cross-Connect Systems Generic Requirements and Objectives", TR-TSY-000233, Issue 2, September 1989, Bell Communications Research. It will be apparent that other wide-band grooming apparatus may be equally employed to realize the inter-ring grooming of communications circuits. One other such inter-ring grooming apparatus is a wide-band digital multiplex system, for example, the DDM-2000 Multiplex System available from AT&T Company.

Ring nodes 110 through 115 are interconnected by transmission path 116 in a counter-clockwise direction and by transmission path 117 in a clockwise direction to form bidirectional line-switched ring 100 in this example, transmission paths 116 and 117 are comprised of optical fibers and each could be comprised of a single optical fiber or two (2) optical fibers. That is, bidirectional line-switched ring transmission system 100 could be either a two (2) optical fiber or a four (4) optical fiber system. In a two (2) optical fiber system, each of the fibers in transmission paths 116 and 117 includes service bandwidth and protection bandwidth. In a four (4) optical fiber system, each of transmission paths 116 and 117 includes an optical fiber for service bandwidth and a separate optical fiber for protection bandwidth. Such bidirectional line-switched ring transmission systems are known. Similarly, ring nodes 120 through 125 are interconnected by transmission path 128 and by transmission path 129 to form bidirectional line-switched ring 101. In this example, transmission of digital signals in the SONET digital signal format is assumed. However, it will be apparent that the invention is equally applicable to other digital signal formats, for example, the CCITT synchronous digital hierarchy (SDH) digital signal formats. In this example, it is assumed that an optical OC-N SONET digital signal format is being utilized for transmission over transmission paths 116 and 117 in bidirectional line-switched ring 100 and a similar or some other digital signal over transmission path 128 in bidirectional line-switched ring 101. The SONET digital signal formats are described in a Technical Advisory entitled "Synchronous Optical Network (SONET) Transport Systems: Common Generic Criteria", TA-NWT000253, Bell Communications Research, Issue 6, September 1990.

For purposes of this description, a "communications circuit" is considered to be a SONET STS-3 digital signal having its entry and exit points on the particular ring. However, for brevity and clarity of exposition, the inter-ring grooming will be described using STS-1 SONET signals as the higher level signals and VT SONET signals as the lower level signals. Again, other digital signal formats may be equally employed. Another example of such digital signal formats are the known DS3 and DS1 digital signals. Additionally, the SDH STM and SDH VC lower order digital signal formats could equally be employed.

It is noted that requests and acknowledgments for protection switch action, in bidirectional line-switched rings 100 and 101, are transmitted in an automatic protection switch (APS) channel of the protection bandwidth on each of transmission paths 116 and 117 for ring 100 and on each of transmission paths 128 and 129 for ring 101. The APS channel, in the SONET format, comprises the K1 and K2 bytes in the SONET overhead of the protection bandwidth. The K1 byte indicates a request of a communications circuit for switch action. The first four (4) bits of the K1 byte indicate the type of switch and the last four (4) bits indicate the ring node identification (ID). The K2 byte indicates an acknowledgment of the requested protection switch action. The first four (4) bits of the K2 byte indicate the ring node ID and the last 4 bits indicate the action taken.

Each of ring nodes 110 through 115 and 120 through 125 comprises an add-drop multiplexer (ADM). Such add-drop multiplexer arrangements are known. For genetic requirements of a SONET based ADM see the Technical Reference entitled "SONET ADD-DROP Multiplex Equipment (SONET ADM) GENERIC CRITERIA", TR-TSY-000496, Issue 2, September 1989, Supplement 1, September 1991, Bell Communications Research. In this example, the ADM operates to pass signals through the ring node, to add signals at the ring node, to drop signals at the ring node, to bridge signals during a protection switch and to loop-back-switch signals during a protection switch at the ring node.

It should be noted that each of ring nodes 110 through 115 and ring nodes 120 through 125 are provisioned with the identities of all active communications circuits including those being added and/or dropped at the node and those passing through. Additionally, those ring interworking communications circuits terminated in shared nodes 130 and 131 are provisioned as such communications circuits. The provisioning of, for example, loop-back- switching node 111 is shown in FIGS. 5 and 6 and described below. It is noted that ring node 111 is the loop-back-switching ring node for ring node 112 in shared node 130. To this end, ring node 111 is provisioned to provide a secondary communications circuit connection for any ring interworking communications circuits terminating in ring node 112 to ring node 114 in additional shared node 131, when ring node 112 has failed. This secondary communications circuit is established on a communications circuit-by-communications circuit basis by controllably allowing the loop-back-switching of communications circuits terminated in ring node 112 to ring node 114 and by controllably not squelching those communications circuits.

Figure 2:
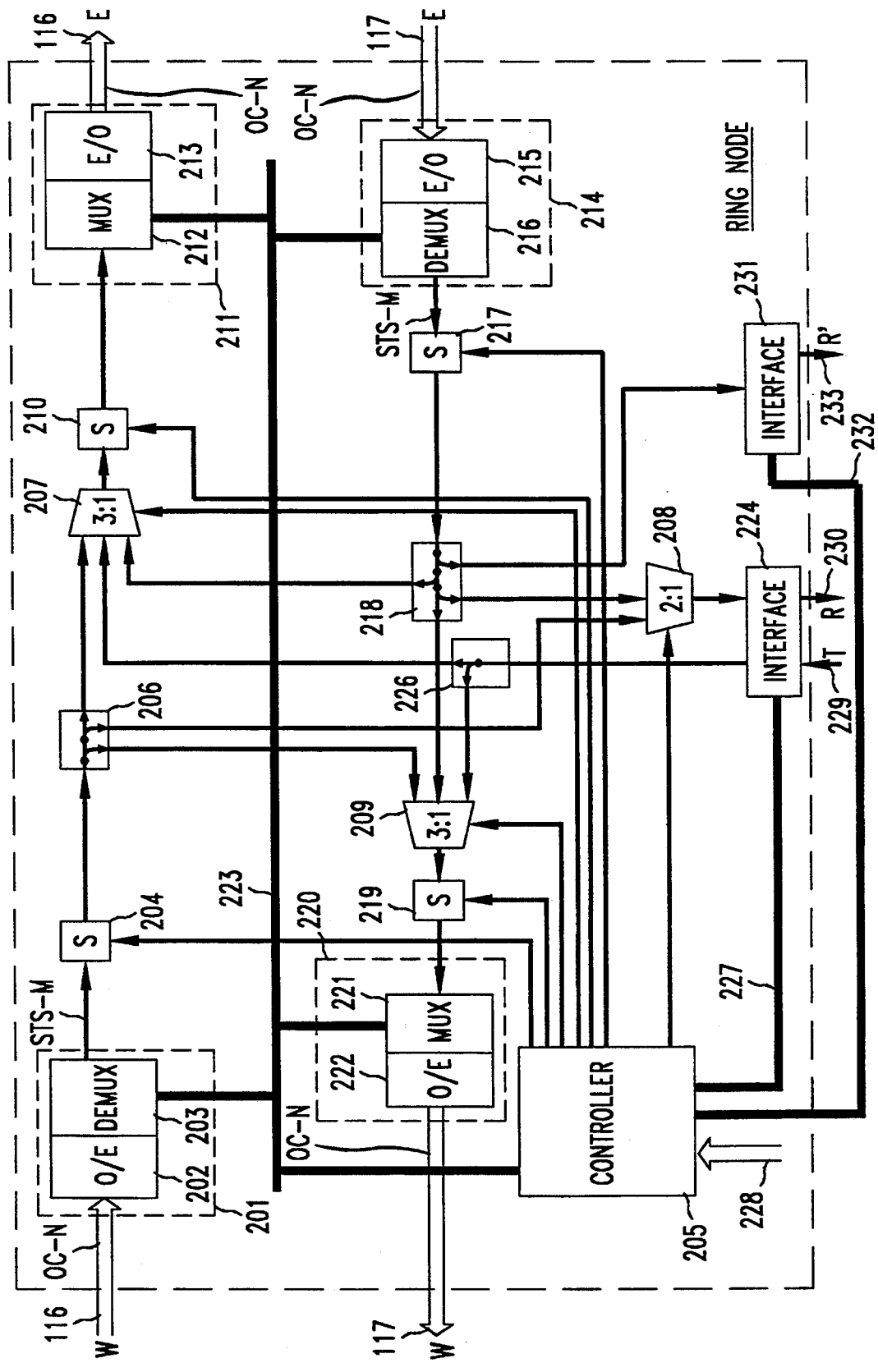
FIG. 2 shows, in simplified block diagram form, details of a ring node which may be employed in the practice of the invention.
Figure 3:
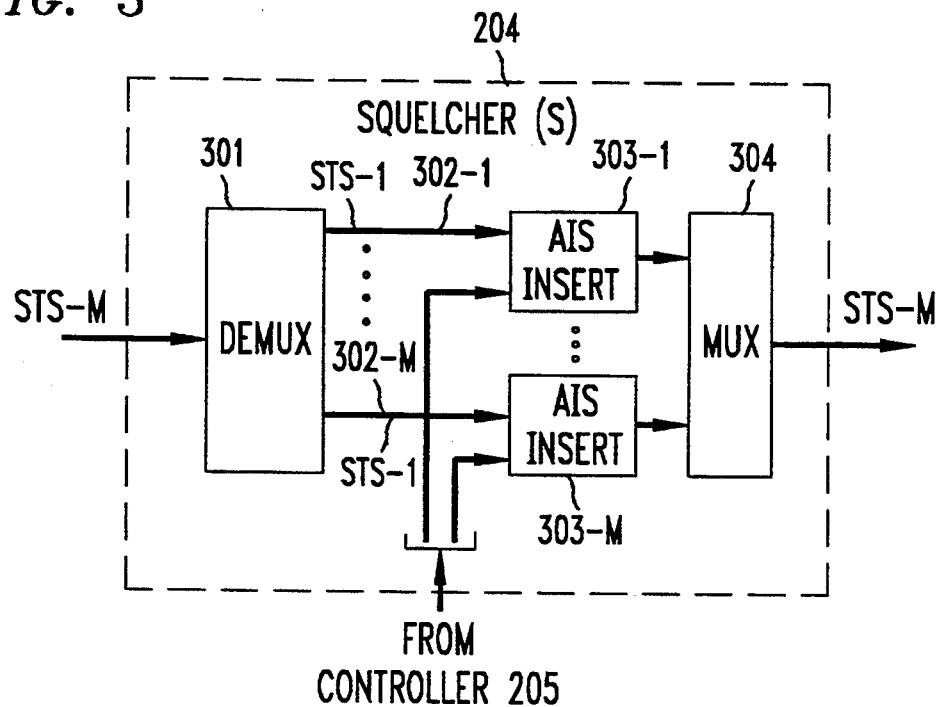
FIG. 3 shows, in simplified block diagram form, details of a squelcher used in the ring node of FIG. 2.
Figure 4:
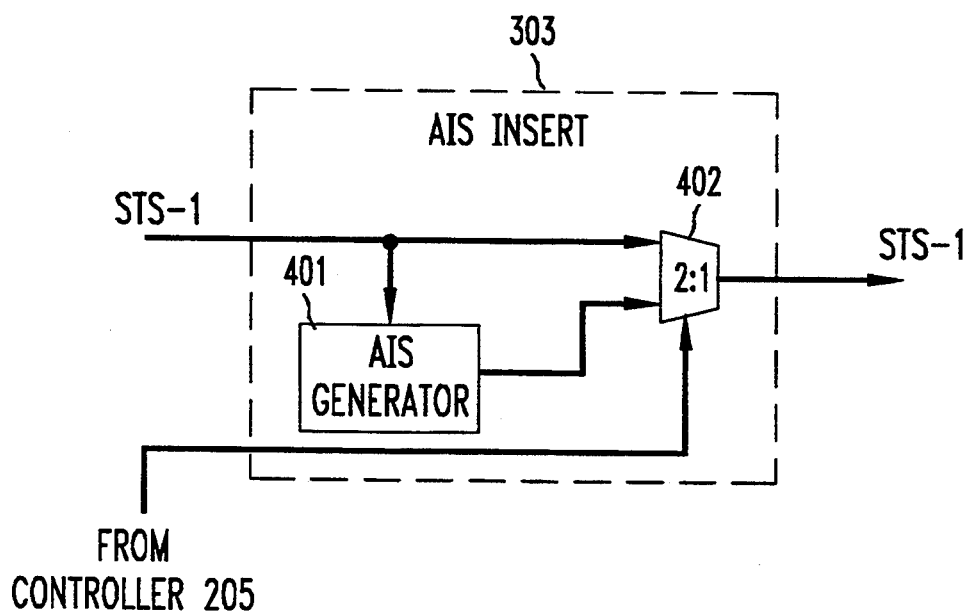
FIG. 4 shows, in simplified block diagram form, details of an AIS insert unit employed in the squelcher of FIG. 3.

FIG. 2 shows, in simplified block diagram form, details of ring nodes 110 through 115 and ring nodes 120 through 125, including an embodiment of the invention. In this example, a west (W)-to-east (E) digital signal transmission direction is assumed in the service bandwidth and the protection bandwidth on transmission path 116. It will be apparent that operation of the ring node and the ADM therein would be similar for an east (E)-to-west (W) digital signal transmission direction in the service bandwidth and the protection bandwidth on transmission path 117. Specifically, shown is transmission path 116 entering the ring node and supplying an OC-N SONET optical signal to receiver 201, where N could be, for example, 3, 12 or 48. Receiver 201 includes an optical/electrical (O/E) interface 202 and a demultiplexer (DEMUX) 203, which yields at least one (1) STS-M SONET digital signal. Such O/E interfaces and demultiplexers are known. In this example, M is assumed to be three (3) and N is greater than M. The STS-M signal output from DEMUX 203 is supplied to squelcher (S) 204, which under control of controller 205, controllably squelches, i.e., blocks, particular incoming communications circuits. Details of squelcher (S) 204 are shown in FIGS. 3 and 4 and its operation is described below. Thereafter, the STS-M signal, squelched or otherwise, is supplied to broadcast element 206. A broadcast element replicates the STS-M signal supplied to it and supplies the replicated signals as a plurality of individual outputs. Such broadcast elements are known. Broadcast element 206 generates three identical STS-M signals and supplies one STS-M signal to an input of 3:1 selector 207, a second STS-M signal to an input of 2:1 selector 208 and a third STS-M signal to an input of 3:1 selector 209. An STS-M signal output from 3:1 selector 207 is supplied to squelcher (S) 210, which is identical to squelcher (S) 204. Squelcher (S) 210 is employed, under control of controller 205, to squelch particular outgoing communications circuits. The STS-M signal output from squelcher (S) 210 is supplied to transmitter 211 and, therein, to multiplexer (MUX) 212. The output of MUX 212 is an electrical OC-N digital signal, which is interfaced to transmission path 116 via electrical/optical (E/O) interface 213. Such multiplexers (MUXs) and electrical/optical (E/O) interfaces are well known.

Similarly, in the east (E)-to-west (W) direction an OC-N optical signal is supplied via transmission path 117 to receiver 214 and, therein, to optical/electrical (O/E) interface 215. In turn, demultiplexer (DEMUX) 216 yields a STS-M signal which is supplied via squelcher (S) 217 to broadcast element 218. Broadcast element 218 replicates the STS-M signal into a plurality of identical STS-M signals, in this example, four (4). One STS-M signal is supplied to an input of 3:1 selector 207, a second STS-M signal is supplied to an input of 2:1 selector 208, a third STS-M signal is supplied to an input of 3:1 selector 209 and a fourth STS-M signal is supplied to interface 231. An output from 3:1 selector 209 is supplied via squelcher (S) 219 to transmitter 220. In transmitter 220, multiplexer (MUX) 229 multiplexes the STS-M into an electrical OC-N and, then, electrical/optical (E/O) interface 222 supplies the optical OC-N signal to transmission path 117.

Thus, in this example, broadcast element 218 supplies the secondary communications circuits from the additional shared node as candidates for through circuits and also drops the secondary communications circuits via interface 231 under control of controller 205. It should be noted that although the communications circuits are SONET STS-3 digital signals, interface 231 and interface 224 drop SONET STS-1 digital signals. Similarly, STS-1 digital signals are combined in the interfaces to form STS-3 digital signals, in known fashion. Additionally, it is noted that selector 208 selects on a STS-1 level. To this end, the STS-3 digital signals are demultiplexed in selector 208 to obtain the three STS-1 digital signals, the STS-1 signals are selected and then multiplexed back into a STS-3 signal, which is supplied to interface 224. Selector 209 in revertively biased under control of controller 205, in accordance with an aspect of the invention, to normally select the STS-M signal being supplied from interface 224.

Controller 205 operates to effect squelching of communications circuits and to selectively allow communications circuit connections to ring node 114 in shared node 131 for communications circuits terminating in ring node 112, when ring node 112 in shared node 130 has failed. Controller 205 communicates with demultiplexers 203 and 216 and multiplexers 212 and 221 via bus 223 and with interface 224 via bus 227. Specifically, controller 205 monitors the incoming digital signals to determine loss-of-signal, alarm conditions, presence of alarm indication signal (AIS), SONET format K bytes and the like. Additionally, controller 205 causes the insertion of appropriate K byte messages for protection switching purposes, examples of which are described below. To realize the desired deterministic squelching of the communications circuits, and the selective allowing of communications circuit connections to ring node 114 for circuits terminating in ring node 112, controller 205 is advantageously provisioned via 228 with the identities (IDs) of all the ring nodes in bidirectional line-switched ring 100 and the identities of all the communications circuits passing through the ring node, including those terminated in a ring interworking node, as well as, those communications circuits being added and/or dropped at the ring node. The squelching of communications circuits and the selective allowance of communications circuit connections to ring node 114 when ring node 112 has failed, under control of controller 205 is described below. Additionally, controller 205 controls the dropping, via interface 231, of the secondary communications circuits being supplied from the secondary ring node of shared node 131 (FIG. 1) and the revertive biasing of selector 209 to normally select the STS-M signal from interface 224 to be added in transmission path 117, in accordance with the principles of the invention. Under abnormal conditions, i.e., a failure or the like, of the STS-M signal being supplied from interface 224, selector 209 is controlled to select a secondary communications circuit being supplied from ring node 114, which is the secondary communications circuit being supplied to interface 231. Upon the failure being corrected or otherwise alleviated, selector 209 automatically reverts back to selecting a new primary communications circuit from interface 224.

Interface 224 is employed to interface, in this example, to the particular inter-ring grooming apparatus being employed. As indicated above, in this example both interface 224 and interface 231 between STS-3 digital signals to STS-1 digital signals, in known fashion. Specifically, an STS-3 digital signal to be dropped at the ring node is supplied to interface 224 via 2:1 selector 208, under control of controller 205, from either broadcast element 206 or broadcast element 218. This STS-3 signal is demultiplexed in interface 224 and supplied as three (3) STS-1 signals (R) to circuit path 230. Similarly, an STS-3 secondary communications circuit being supplied, via broadcast element 218, to interface 231 is demultiplexed therein, under control of controller 205, and supplied as three (3) STS-1 signals (R') to circuit path 233. A signal (T) to be added at the ring node is supplied to interface 224 where it is converted to the STS-M digital signal format, if necessary. The STS-M digital signal is then supplied to broadcast element 226 where it is replicated. The replicated STS-M digital signals are supplied by broadcast element 226 to an input of 3:1 selector 207 and an input of 3:1 selector 209. In this example, 3:1 selectors 207 and 209, under control of controller 205, select the signal being added for transmission in the service or protection bandwidth on either transmission path 116 or transmission path 117.

It should be noted that, in this example, the normal transmission path for a duplex digital signal being added at the ring node would be in the service bandwidth on transmission path 116 and transmission path 117, for example, towards the west (W). If there were to be a protection switch, the signal (T) being added from interface 224 would be bridged via broadcast element 226 and chosen by 3:1 selector 207, under control of controller 205, to the protection bandwidth on transmission path 116. Similarly, if there were to be a loop-back protection switch and the ring node was adjacent to the failed ring node, the signal (R) to be dropped at the ring node would be received in the protection bandwidth on transmission path 117 and would be switched from broadcast element 218 via 2:1 selector 208 to interface 224. Otherwise, the signal (R) to be dropped would be switched in a ring node adjacent the failure from the protection bandwidth on transmission path 117 to the service bandwidth on transmission path 116 and received at the ring node in usual fashion. Then, the signal (R) being dropped from transmission path 116 is supplied via broadcast element 206 and 2:1 selector 208 to interface 224.

Controller 205 controls and monitors the status of interface 224 and the digital signals being supplied thereto via bus 227 and controls and monitors interface 231 via bus 232. Specifically, controller 205 monitors interface 224 for loss-of-signal, coding violations and the like.

Under control of controller 205, digital signals may be passed through, added at, dropped at, bridged at or loop-back-switched at the ring node. In ring node 112 of shared node 130, a drop and pass-on of a first transmission direction of a duplex communications circuit is realized, under control of controller 205 by broadcast element 206 and 3:1 selector 207. To this end, broadcast element 206 replicates the STS-M digital signal and supplies one of the resulting STS-M digital signals to 2:1 selector 208 and another STS-M to 3:1 selector 207. In this manner, the same STS-M digital signal is available to be dropped in ring node 112 and passed-on to ring node 114. If interface 224 or the hand-off duplex link to interface 224 in ring node 112 fails, a good STS-M is still supplied in ring node 114 to ring node 125 of ring 101 in shared node 131. A loop-back-switch of an STS-M digital signal incoming in the service bandwidth on transmission path 116 is effected by controller 205 causing 3:1 selector 209 to select the STS-M digital signal from broadcast element 206 and supplying it via squelcher (S) 219 to transmitter 220. In turn, transmitter 220 supplies an OC-N optical signal to the protection bandwidth on transmission path 117. Note that when used as a primary node and a loop-back-switch is being made via selector 209 that selector 207 must be provisioned to select the same STS-M digital signal as selector 209. It will be apparent that in the loop-back-switch operation, if the signal is incoming in service bandwidth on transmission path 116, it will be loop-back-switched to the protection bandwidth on transmission path 117 and vice versa, except for communications circuits being added and/or dropped at the ring node. If the signal is incoming in the protection bandwidth on transmission path 116, it will be loop-back-switched to the service bandwidth on transmission path 117 and vice versa. A signal to be added at the ring node is supplied from interface 224, replicated via broadcast element 226 and selected either by 3:1 selector 207 or 3:1 selector 209, under control of controller 205, to be added on transmission path 116 or transmission path 117, respectively. Again, note that selector 209 is biased under control of controller 205 to normally select the STS-M signals being supplied from interface 224. Additionally, if there was a failure of the inter-ring grooming apparatus and/or the hand-off thereto in this node, the secondary communications circuits supplied via broadcast element 218 would be selected as through circuits by selector 209 under control of controller 205. A digital signal to be dropped at the ring node is selected by 2:1 selector 208, under control of controller 205, either from broadcast element 206 (transmission path 116) or broadcast element 218 (transmission path 117). The pass-through and loop-back functions for a signal incoming on transmission path 117 is identical to that for an incoming signal on transmission path 116. In ring node 112 of shared node 130, the replication of the duplex communications circuit from ring node 114 of shared node 131 for circuits intended to be added in ring node 112, is realized under control of controller 205, in accordance with the invention, by 3:1 selector 209 selecting an incoming signal from ring node 114 when either interface 224 or the hand-off duplex link in ring node 112 fails. It is noted, that when the node is used as a secondary node, no special functions and no special provisioning are required.

Possible communications circuit misconnections are avoided in bidirectional line-switched ring 100, by deterministically squelching each communications circuit terminated in a failed ring node, other than a communications circuit terminated in its primary interworking ring node, in ring loop-back-switching nodes adjacent to the failed ring nodes(s). A primary interworking ring node for a communications circuit is provisioned to broadcast the communications circuit to a secondary interworking ring node and to controllably select a communications circuit from the secondary interworking ring node. In this example, the primary interworking ring node is the ring node at which a communications circuit is intended to be transported to and from ring 101. To this end, each ring node in bidirectional line-switched ring transmission system 100 is typically equipped to effect the desired squelching via squelchers (S) 204, 210, 217 and 219, under control of controller 205. In this example, both incoming and outgoing communications circuits are squelched, however, it may only be necessary to squelch outgoing communications circuits.

Additionally, in this example, ring nodes 111 and 113 adjacent ring node 112 in shared nodes 130 are provisioned, in accordance with the principles of the invention, to selectively allow a secondary communications circuit connection to ring node 114 in secondary shared node 131 for communications circuits terminated in ring node 112, when ring node 112 fails. This secondary communications circuit connection is realized, in accordance with the principles of the invention, by not squelching the communications circuits terminated in ring node 112 in adjacent nodes 111 and 113 when ring node 112 fails. Instead, the communications circuits terminated in ring node 112 in their primary shared node 130 are loop-back-switched in ring nodes 111 and 113 and supplied to ring node 114 in their secondary shared node 131. It should be noted, however, if either ring node 114 in shared node 131 or the ring node terminating the communications circuit in ring 100 has also failed, then the communications circuits terminated in their primary interworking ring node 112 are squelched.

FIG. 3 shows, in simplified block diagram form, details of an exemplary squelcher (S) unit. Specifically, the STS-M digital signal is supplied to demultiplexer (DEMUX) 301 where it is demultiplexed into its constituent M STS-1 digital signals 301-1 through 302-M. The M STS-1 digital signals are supplied on a one-to-one basis to AIS insert units 303-1 through 303-M. AIS insert units 303-1 through 303-M, under control of controller 205, insert the AIS in the STS-1 digital signals included in the communications circuits, i.e., STS-M digital signals, to be squelched. Details of AIS insert units 303 are shown in FIG. 4 and described below. Thereafter, the M STS-1 digital signals are multiplexed in multiplexer (MUX) 304 to yield the desired STS-M digital signal. The details of multiplex schemes for the STS-M digital signal are described in the technical advisory TA-NWT-000253, noted above.

FIG. 4 shows, in simplified block diagram form, details of AIS insert units 303. Specifically, shown is a STS-1 digital signal being supplied to AIS generator 401 and to one input of 2:1 selector 402. AIS generator 401 operates to insert AIS in the STS-1 digital signal. As indicated in the technical advisory TA-NWT-000253, the STS path AIS is an all ones (1's) signal in the STS-1 overhead bytes H1, H2 and H3 and the bytes of the entire STS SPE (synchronous payload envelope). Selector 402 selects as an output, under control of controller 205, either the incoming STS-1 digital signal or the STS-1 digital signal with AIS inserted from AIS generator 401.

FIG. 5 is a table including the identification (ID) of ring nodes 110 through 115 for bidirectional line-switched ring 100. The ring node IDs are stored in a look-up table which is provisioned via 228 in memory of controller 205 (FIG. 2).

FIG. 6 is illustrative of a table including the identification of all the active communications circuits in a ring node, in this example, ring node 111 for a counter-clockwise orientation of nodes 110 through 115. The active communications circuits include those being added, being dropped or passing through ring node 111 and, additionally, those terminated in an interworking ring node. The table including the IDs of the active communications circuits in the ring node are provisioned via 228 in a look-up table in memory of controller 205. Shown in the table of FIG. 6 are the STS-M communications circuit numbers (#) a through d, the ring node including the communications circuit entry point, i.e., the A termination for the communications circuit, and the ring node(s) including the communications circuit exit point(s), i.e., the Z termination(s) for the communications circuit and whether the communications circuit is an interworking communications circuit. An interworking communications circuit is one which has terminations in both bidirectional-line switched ring 100 and bidirectional line-switched ring 101. A communications circuit terminated in its primary interworking ring node 112 in shared node 130 is shown as being broadcast to its secondary interworking ring node 114 in shared node 131 and identified in the provisioning as being a ring interworking communications circuit. Thus, the communications circuit ID table of FIG. 6, shows that STS-M(a) enters ring 100 at ring node 110 and exits ring 100 at ring node 111, and is not a ring interworking communications circuit. STS-M(b) enters ring 100 at ring node 111 and exits at ring nodes 113 and is not a ring interworking communications circuit. STS-M(c) enters ring 100 at ring node 110 and normally exits at ring node 112, and is a interworking communications circuit. If interworking ring node 112 fails, the communications circuits terminated in it will not be squelched in adjacent ring nodes 111 and 113, but will be supplied via loop-back-switching to its secondary interworking ring node 114. Provided, however, that neither the secondary interworking ring node 114 for the communications circuit nor the ring node terminating the communications circuit in ring 100 has also failed. STS-M(d) enters ring 100 at ring node 111 and exits at ring node 115. Although the ring nodes designated A terminations are considered entry points and the ring nodes designated Z terminations are considered exit points, it will be apparent that the individual communications circuits may be duplex circuits having entry and exit points at each such node. It should be noted that heretofore only the communications circuits being added and/or dropped at the node were provisioned therein. Additionally, it is noted that primary interworking ring node 112 is provisioned, in accordance with an aspect of the invention, such that it will normally be adding the communications circuits being supplied thereto via path 229 and interface 224 (FIG. 2). If the inter-ring grooming apparatus, circuit paths to the inter-ring grooming apparatus, interface 224 or circuit path 229 fail, then the through candidate communications circuits being supplied from secondary interworking ring node 114 are selected via selector 209 (FIG. 2). Again, the revertive selection is important so that "good" "new" inter-ring groomed STS-M communications circuits are added in the transmission path in primary interworking ring node 112. However, when the failure is removed primary interworking node 112 will again revert to adding the communications circuits being supplied via path 229 and interface 224.

Figure 7:
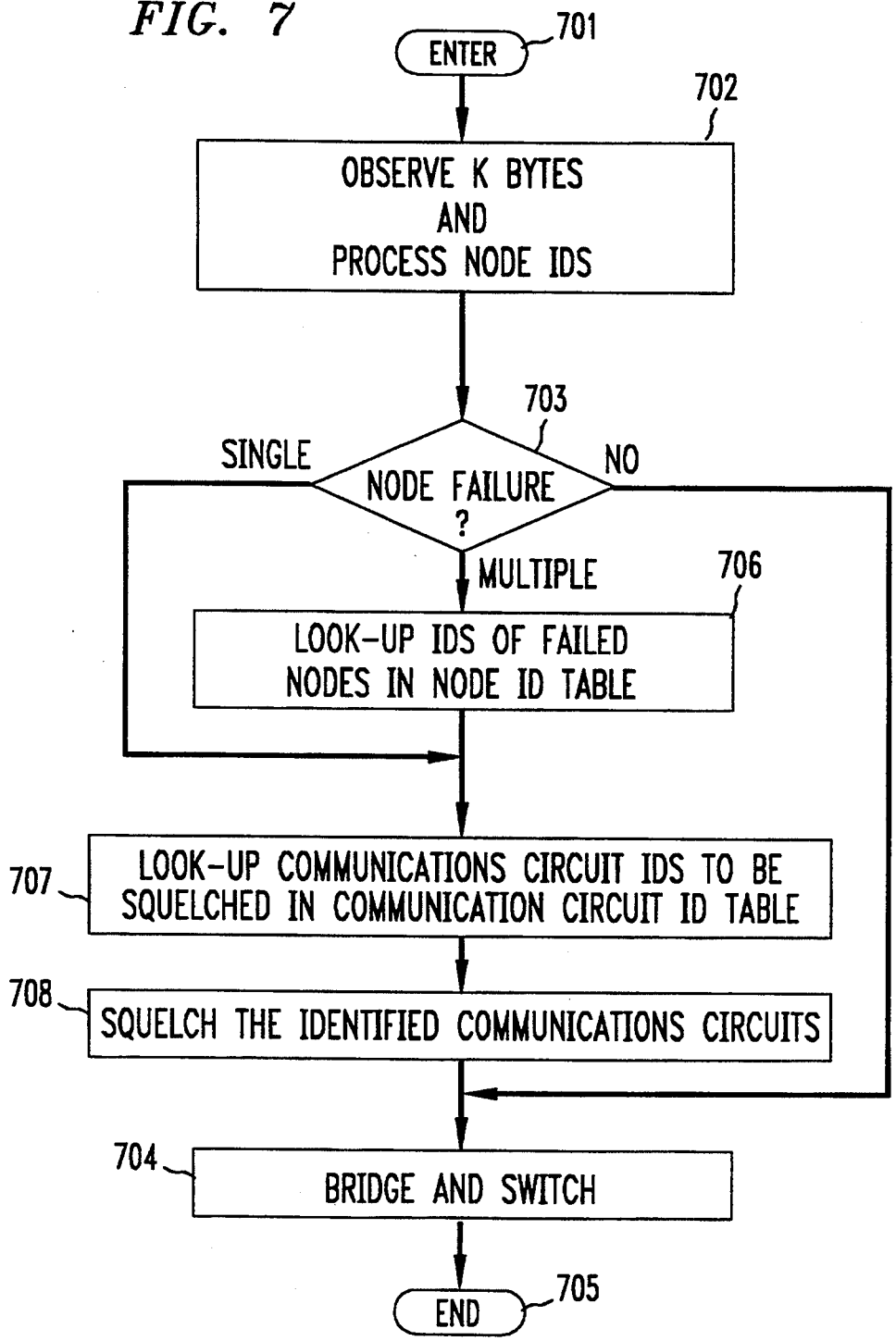
FIG. 7 is a flow chart illustrating the squelch and switch operation of the controller of FIG. 2.

FIG. 7 is a flow chart illustrating the operation of controller 205 in controlling the operation of the ring nodes in order to effect the deterministic squelching of communications circuits and the selective provisioning of the secondary duplex communications circuit connection(s) to secondary interworking ring node 114 for communications circuits terminated in their failed primary interworking ring node 112. Specifically, the process is entered via step 701. Then, operational block 702 causes the K bytes of an incoming OC-N signal to be observed and processes the ring node IDs therein. Then, conditional branch point 703 tests to determine if the processed ring node IDs indicate that one or more ring nodes have failed. Again, a ring node failure is defined as to include node equipment failure and so-called node isolation failure caused by fiber cuts and the like. Specific examples of failure conditions are discussed below. Thus, if the processed ring node IDs indicate no ring node failure, the failure is other than a ring node and operational block 704 causes the usual bidirectional ring bridging and switching to be effected. Thereafter, the process is ended via step 705. If the processed ring node IDs indicate a multiple ring node failure, operational block 706 causes the failed ring node IDs to be obtained from the ring node ID look-up table in memory. Then, control is passed to operational block 707 which causes the identity (ID) of the affected communications circuits to be obtained from the communications circuit ID look-up table in memory. If step 703 indicates a single ring node failure, the failed ring node ID is already known and control is passed directly to step 707. Once the affected communications circuits are identified, operational block 708 causes the appropriate ones of squelchers (S) 204, 210, 217 and 219 (FIG. 2), in this example, to squelch those identified communications circuits in the ring node. As indicated above, all communications circuits active in this ring node that are terminated in a failed ring node are squelched. For the purpose of squelching a broadcast communications circuit, only the first "A" and last "Z" terminations are used to trigger the squelching. A ring interworking communications circuit is treated, for the purpose of squelching, just like a broadcast communications circuit from its termination in bidirectional line-switched ring 100 to its primary shared node and secondary shared node. Operational block 704 causes the communications circuits not terminated in the failed ring node(s) to be bridged and switched to "heal" the ring. Thereafter, the process is ended in step 705.

Figure 8:
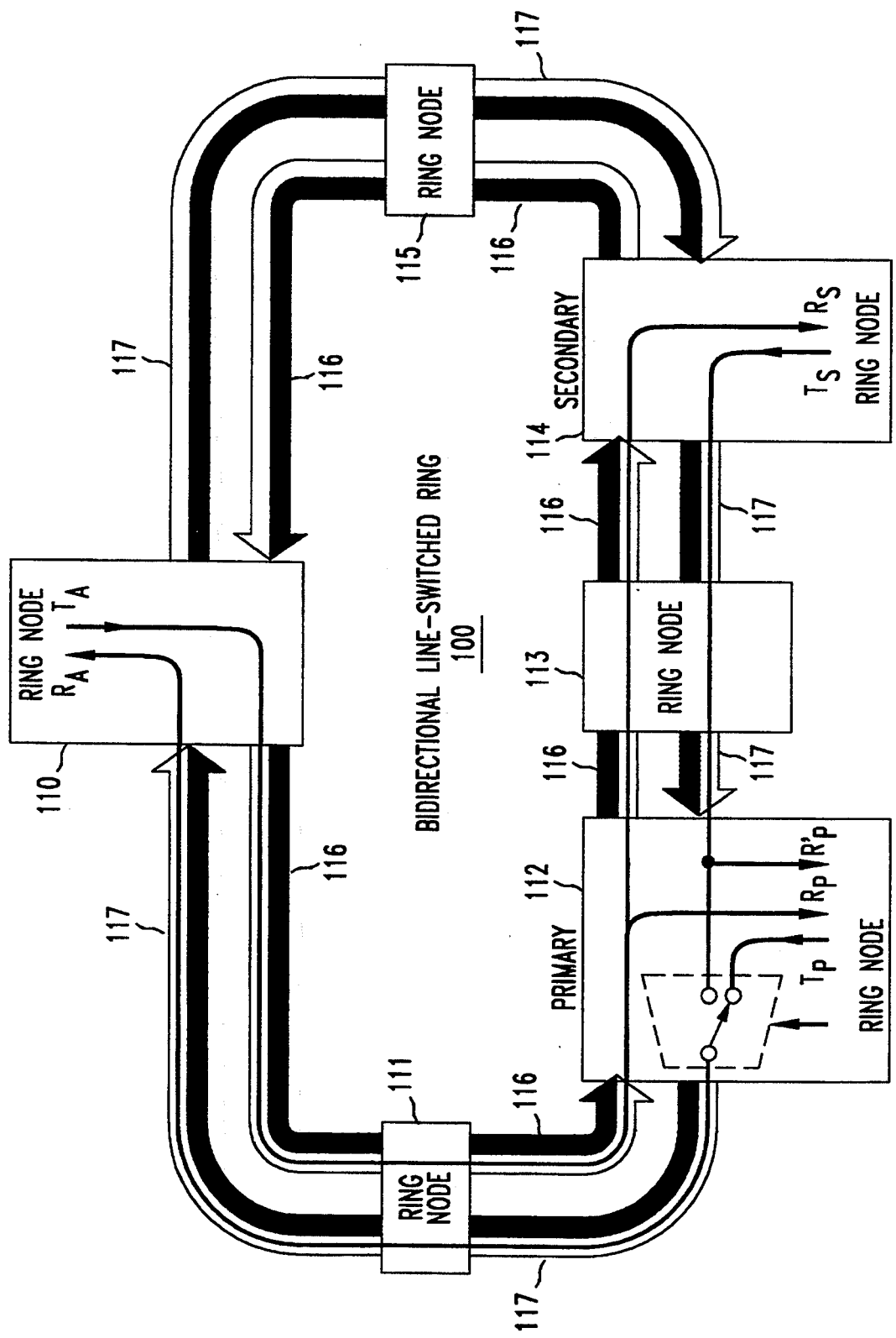
FIG. 8 illustrates the "normal" operation in bidirectional line-switched ring 100 including the first and second shared nodes.

FIG. 8 illustrates in simplified form a "normal" ring interworking communications circuit connection in bidirectional line-switched ring 100. Specifically, the communications circuit connection is between ring node 110, the A termination, and its primary interworking ring node 112. Thus, one portion ($T_A$) of the duplex communications circuit enters ring 100 at ring node 110 and is supplied in the service bandwidth of transmission path 116 through ring node 111 to its primary interworking ring node 112. The received portion of the communications circuit is normally handed-off as $R_p$ in ring node 112. However, the received portion is also passed along through ring node 113 to also be received at its secondary interworking ring node 114 as $R_S$. Similarly, another portion ($T_p$) of the duplex communications circuit normally enters ring 100 at its primary interworking ring node 112 and is selected to be supplied to the service bandwidth of transmission path 117. In transmission path 117, this portion of the communications circuit is passed through ring node 111 and received as $R_A$ at ring node 110. Additionally, this portion of the communications circuit is supplied as $T_S$ from secondary interworking ring node 114 in the service bandwidth of transmission path 117 through ring node 113 and is available as a candidate to be selected for transmission at primary interworking ring node 112. The communications circuit $T_S$ is also dropped at primary ring node 112 as unidirectional communications circuit $R'^P$, in accordance with an aspect of the invention. Then communications circuit $R'^P$ is available so that the lower level digital signals may be obtained for comparison and selection, in accordance with the invention. As indicated above, this selection of $T_S$ occurs if the hand-off link fails in primary interworking ring node 112. It should be noted that ring node 112 can be provisioned to normally select the communications circuit $T_S$ from ring node 114.

Although not specifically shown in FIG. 7, it is noted that if the hand-off link fails in the primary interworking ring node 112 for a communications circuit, the affected communications circuit or portion of it is being broadcast along to be obtained in the secondary interworking ring node 114 for the communication circuit. Specifically, if the receive ($R_P$) portion of the hand-off link fails in primary interworking ring node 112, it is passed along via broadcast element 206 and 3:1 selector 207 (FIG. 2) and selected to be handed-off as $R_S$ in secondary interworking ring node 114. Similarly, if the transmit ($T_P$) portion of the hand-off link fails in primary interworking ring node 112, controller 205 in ring node 112 causes 3:1 selector 209 (FIG. 2) to select the transmit ($T_S$) portion of the communications circuit from secondary interworking ring node 114.

Figure 9:
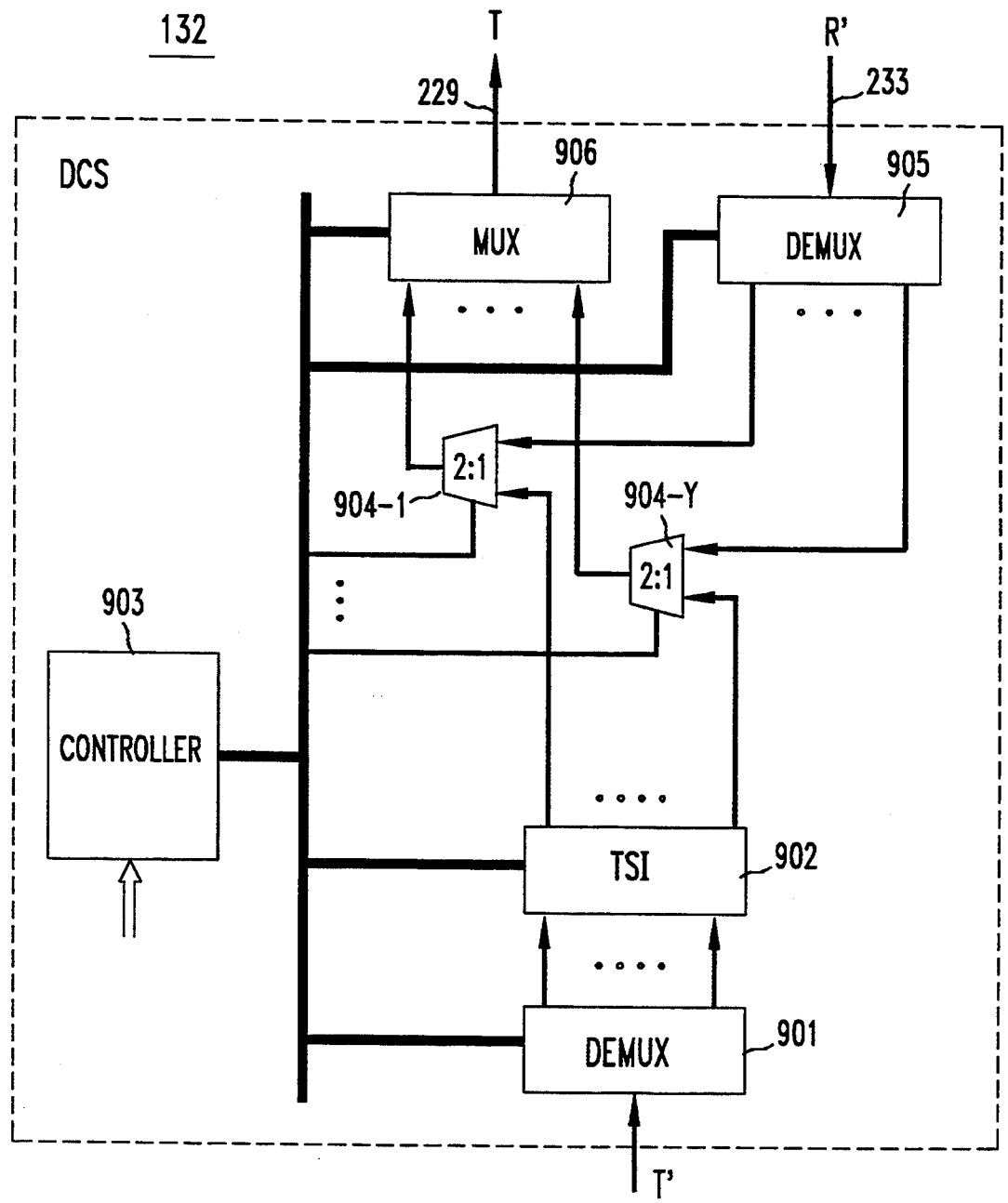
FIG. 9 shows, in simplified block diagram form, a DCS including apparatus embodying an aspect of the invention.

FIG. 9 shows, in simplified block diagram form, a digital cross-connect system (DCS) including apparatus embodying an aspect of the invention. It is noted that for brevity and clarity of description only one direction of signal transmission is shown and only one digital signal will be considered. It will be apparent to those skilled in the art that there is a similar opposite direction of transmission and that a relatively large number of digital signals would normally be groomed by such a DCS. Again, in this example, a SONET STS-1 digital signal is being groomed at the lower VT digital signal level. Specifically, shown is an STS-1 signal (T') being supplied from ring node 120 (FIG. 1) in bidirectional line-switched ring 101 to DCS 132 and therein to demultiplexer (DEMUX) 901. DEMUX 901 demultiplexes the STS-1 signal to obtain the VT signals in known fashion. The VT signals are supplied to time slot interchanger (TSI) 902 where they are groomed under control of controller 903. Then, the groomed, VT signals are supplied on a one-to-one basis to 2:1 selectors 904-1 through 904-Y, where Y is the number of VT signals being transported by the STS-1 signal. Similarly, a corresponding inter-ring groomed STS-1 signal (R') supplied from secondary interworking ring node 114 in shared node 131 is demultiplexed in demultiplexer (DEMUX) 905 to obtain VT signals which correspond on a one-to-one basis with the VT signals being supplied to selectors 904 from TSI 902. The VT signals from DEMUX 905 are supplied on a one-to-one basis to other inputs of selectors 905-1 through 905-Y. Controller 903 evaluates the VT signals on a pair-Wise basis, in this example, in both DEMUX 901 and DEMUX 905, to determine the best VT signal in each pair and, then, causes selectors 904 to select the best VT signals. The evaluation may include monitoring the VT signals for loss of signal, AIS and/or bit error rate. The selection of the VT signals is such that the corrupted and/or failed VT signals are not selected. Thereafter, the selected VT signals are combined via multiplexer (MUX) 906 to obtain the desired inter-ring groomed STS-1 signal (T).

Figure 10:
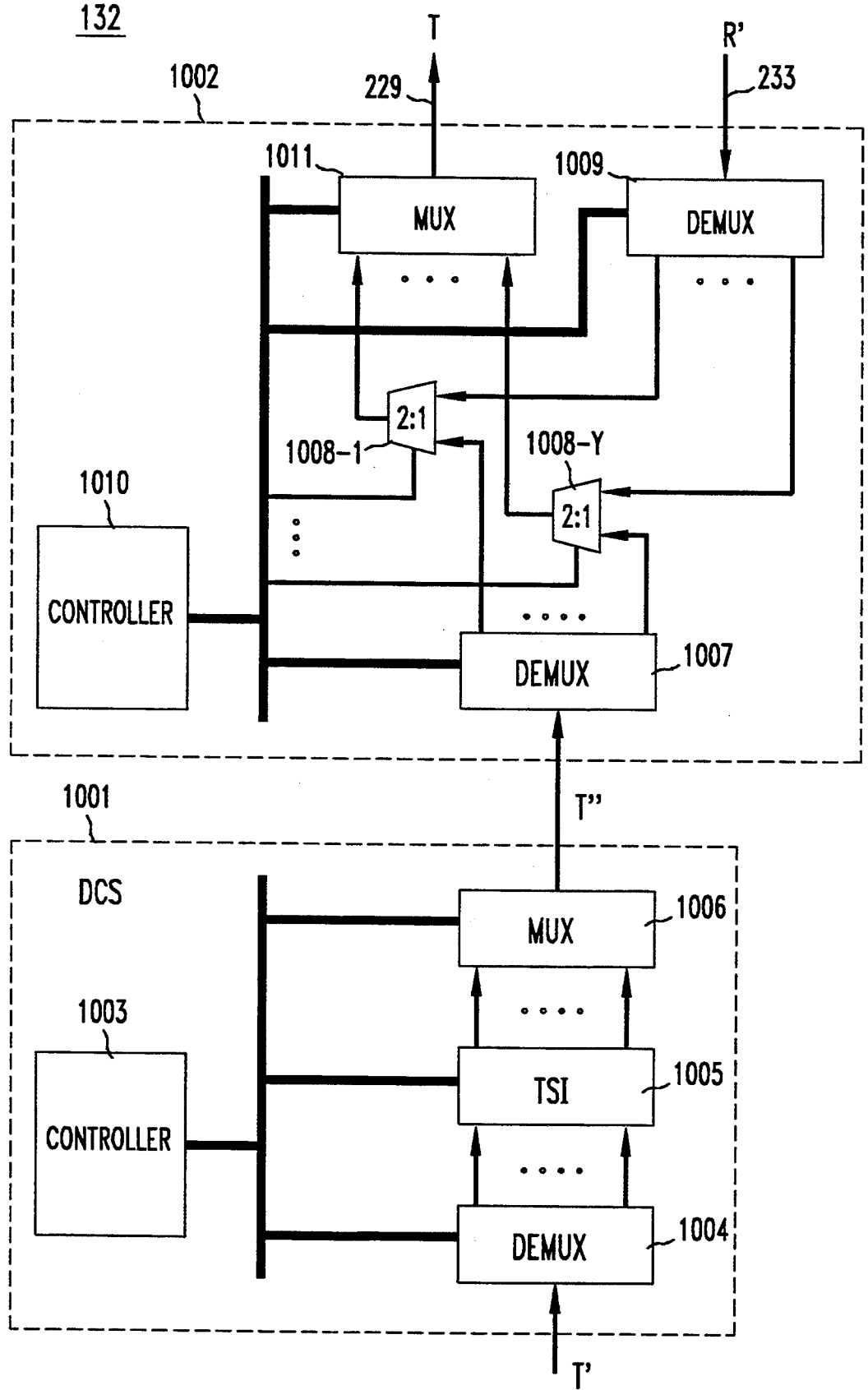
FIG. 10 shows, in simplified block diagram form, a DCS and an adjunct apparatus including an aspect of the invention.

FIG. 10 shows, in simplified block diagram form another arrangement embodying an aspect of the invention. Specifically, shown are DCS 1001 and selector unit 1002 which form inter-ring grooming apparatus 132. It is noted that for brevity and clarity of description only one direction of signal transmission is shown and only one digital signal will be considered. It will be apparent to those skilled in the art that there is a similar opposite direction of transmission and that a relatively large number of digital signals would normally be groomed by such a DCS. Again, in this example, a SONET STS-1 digital signal is being groomed at the lower VT digital signal level. DCS 1001 includes controller 1003, DEMUX 1004, TSI 1005 and MUX 1006 and operates in known fashion to groom STS-1 signals at the VT signal level. Specifically, shown is an STS-1 signal (T') being supplied from ring node 120 (FIG. 1) in bidirectional line-switched ring 101 to DCS 1001 and therein to DEMUX 1004. DEMUX 1004 demultiplexes the STS-1 signal to obtain the VT signals in known fashion. The VT signals are supplied to TSI 1005 where they are groomed under control of controller 1003. Then, the groomed VT signals are supplied to MUX 1006 where they are combined into a groomed STS-1 signal (T"). The groomed STS-1 signal T" is supplied to selector unit 1002 and therein to DEMUX 1007. DEMUX 1007 demultiplexes the groomed STS-1 signal T" to obtain the VT signals. The, the VT signals are supplied on a one-to-one basis to first inputs of 2:1 selectors 1008-1 through 1008-Y, where Y is the number of VT signals being transported by the STS-1 signal. Similarly, a corresponding inter-ring groomed STS-1 signal (R') supplied from secondary interworking ring node 114 in shared node 131 is demultiplexed in DEMUX 1009 to obtain VT signals which correspond on a one-to-one basis with the VT signals being supplied to selectors 1008 from DEMUX 1007. The VT signals from DEMUX 1009 are supplied on a one-to-one basis to second inputs of selectors 1008-1 through 1008-Y. Controller 1010 evaluates the VT signals on a pair-wise basis, in this example, in both DEMUX 1007 and DEMUX 1009, to determine the best VT signal in each pair and, then, causes selectors 1008 to select the best VT signals. The evaluation may include monitoring the VT signals for (include here types of monitoring). The selection of the VT signals is such that the corrupted and/or failed VT signals are not selected. Thereafter, the selected VT signals are combined via MUX 1011 to obtain the desired inter-ring groomed STS-1 signal (T).

Figure 11:
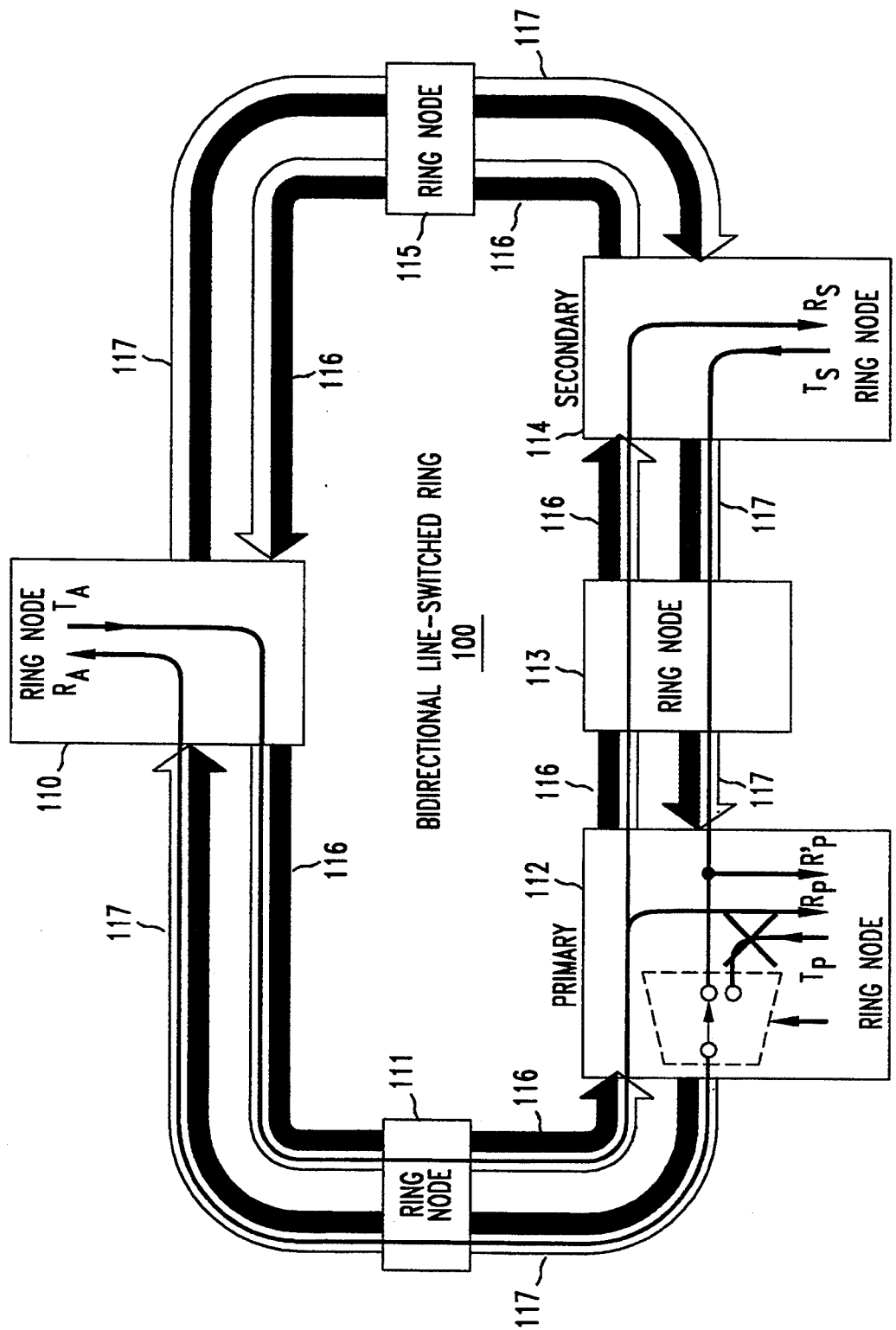
FIG. 11 illustrates the operation in bidirectional line-switched ring 100 in the presence of a failure of a so-called hand-off link to the first ring node 112.

FIG. 11 illustrates the ring interworking communications circuit transmission in ring 100 when a failure arises in the hand-off link in its primary interworking node 112. As indicated above, when a portion of the hand-off link fails, for example, the transmit portion $T_P$, the same "good" transmit signal $T_S$ from secondary interworking ring node 114 is selected in primary interworking ring node 112 to be supplied in the service bandwidth on transmission path 117 to ring node 110. Primary interworking ring node 112 can still select the received portion ($R_P$) of the communications circuit from ring node 110. However, if the received portion of the hand-off link has failed, secondary interworking ring node 114 selects the received signal ($R_S$), which is passed-on from primary interworking ring node 112.

The above-described arrangements are, of course, merely illustrative of the application of the principles of the invention. Other arrangements may be devised by those skilled in the art without departing from the spirit or scope of the invention. It will be apparent that evaluation and selection of the lower level digital signals from the primary inter-ring groomed communications circuits and the secondary inter-ring groomed communications circuits could also be included in the primary ring nodes.

I claim:

1. A communications system including,
   a first bidirectional line-switched ring transmission system including first and second communications paths for transporting communications circuits in opposite directions around the ring,
   a second bidirectional line-switched ring transmission system including first and second communications paths for transporting communications circuits in opposite directions around the ring,
   each communications circuit having a first bit rate and including a plurality of digital signals each having a lower bit rate than the first bit rate,
   a first interworking node having a first ring node in each of the first and second bidirectional line-switched ring transmission systems and a first inter-ring grooming apparatus interposed between the first ring nodes for arranging the lower bit rate digital signals into primary communications circuits at the first bit rate,
   a second interworking node having a second ring node in each of the first and second bidirectional line-switched ring transmission systems and a second inter-ring grooming apparatus interposed between the second ring nodes for arranging the lower bit rate digital signals into primary communications circuits at the first bit rate, one of said interworking nodes being a primary interworking node and the other of said interworking nodes being a secondary interworking node,
   the communications system further comprising,
   a second ring node being provisioned to supply at least one secondary inter-ring groomed communications circuit to the first ring node in the same bidirectional line-switched ring transmission system, the secondary communications circuit corresponding to a primary inter-ring groomed communications circuit being supplied from the first inter-ring grooming apparatus, means for demultiplexing the at least one secondary communications circuit to obtain the plurality of lower bit rate digital signals, means for evaluating in accordance with prescribed criteria the lower bit rate digital signals from the secondary communications circuit on a pair-wise basis with corresponding lower bit rate digital signals of the corresponding primary communications circuit to determine the lower bit rate signal in each pair which is least corrupted, means responsive to the results of the evaluating for selecting the least corrupted one of the lower bit rate digital signals in the pairs, means for combining the selected lower bit rate digital signals into a new primary communications circuit, and means for normally inserting the new primary communications circuit into a communications path in said same bidirectional line-switched ring transmission system, wherein the evaluation and selection of the lower bit rate digital signals is only performed in said primary interworking node.

2. The invention as defined in claim 1 wherein said means for inserting includes controllable selector first means for selecting the new primary communications circuit during normal conditions and for selecting the corresponding secondary communications circuit during abnormal conditions.

3. The invention as defined in claim 2 wherein said means for inserting further includes means for controlling said first means for selecting to automatically revert to selecting the new primary communications circuit upon a return from the abnormal conditions to the normal conditions.

4. The invention as defined in claim 3 wherein communications circuits from a bidirectional line-switched ring transmission system are each supplied to each of the first and second inter-ring grooming apparatus for inter-ring grooming of the lower bit rate digital signals therein.

5. The invention as defined in claim 4 wherein said communications circuits are comprised of SONET STS type digital signals and said lower bit rate digital signals are SONET VT type digital signals.

6. The invention as defined in claim 4 wherein said communications circuits are comprised of DS3 digital signals and said lower bit rate digital signals are DS1 digital signals.

7. The invention as defined in claim 4 wherein said communications circuits are comprised of SDH STM type digital signals and said lower bit rate digital signals are SDH VC lower order digital signals.

* * * * *